United States Patent [19]

Hirano

[11] Patent Number: 5,745,862
[45] Date of Patent: Apr. 28, 1998

[54] MOVEMENT STATE CONTROL APPARATUS FOR WHEELED VEHICLE

[75] Inventor: Yutaka Hirano, Susono, Japan

[73] Assignee: Toyota Jidosha Kabushiki Kaisha, Toyota, Japan

[21] Appl. No.: 511,364

[22] Filed: Aug. 4, 1995

[30] Foreign Application Priority Data

Aug. 8, 1994 [JP] Japan .................................. 6-186118

[51] Int. Cl.⁶ .................................................. B62D 6/00
[52] U.S. Cl. .................................. 701/1; 701/42; 180/410
[58] Field of Search .................... 364/424.052, 426.016, 364/423.098; 180/480, 197, 410–413, 421–423; 280/91.9

[56] References Cited

U.S. PATENT DOCUMENTS

| | | | |
|---|---|---|---|
| 4,666,013 | 5/1987 | Shibahata et al. | 364/424.052 |
| 4,706,771 | 11/1987 | Kawabe et al. | 364/424.052 |
| 4,834,205 | 5/1989 | Mizuno et al. | 364/424.052 |
| 4,878,557 | 11/1989 | Shibahata et al. | 364/424.052 |
| 5,150,764 | 9/1992 | Eguchi et al. | 364/424.052 |
| 5,251,135 | 10/1993 | Serizawa et al. | 364/424.052 |
| 5,430,650 | 7/1995 | Susuki et al. | 364/424.052 |
| 5,448,481 | 9/1995 | Asanuma et al. | 364/424.052 |

FOREIGN PATENT DOCUMENTS

| | | |
|---|---|---|
| 60-161255 | 8/1985 | Japan . |
| A-6-293274 | 10/1994 | Japan . |
| A-6-293275 | 10/1994 | Japan . |

*Primary Examiner*—Gary Chin
*Attorney, Agent, or Firm*—Oliff & Berridge, PLC

[57] ABSTRACT

A movement state control apparatus for a wheeled vehicle capable of constantly maintaining the movement state of the vehicle in an optimal condition even if various kinds of parameters of the vehicle are changed. The control apparatus includes a yaw rate sensor for detecting a yaw rate as one of movement state variables of the vehicle, a microcomputer programmed to detect a lateral slip angle as one of the other movement state variables for determining a target yaw rate and a target lateral slip angle as a target movement state variable and to calculate a feedback rear wheel steering angle by multiplying a difference between the detected movement state variable and the target movement state variable with a feedback gain of a predetermined frequency characteristic for ensuring robust stability of the vehicle and robust control performance without any influences caused by a zero-point drift and high frequency noises of the yaw sensor.

2 Claims, 7 Drawing Sheets

MOVEMENT STATE CONTROL APPARATUS FOR WHEELED VEHICLE

BACKGROUND OF THE INVENTION

1. Field of the Invention

The present invention relates to a movement state control apparatus for a wheeled vehicle which is designed to control a movement state control mechanism such as a four-wheel steering mechanism, a hydraulic braking force distribution mechanism or the like, and more particularly to a movement state control apparatus capable of approaching a movement state of the vehicle while turning to an ideal state in lateral dynamics.

2. Description of the Prior Art

Disclosed in Japanese Patent Laid-open Publication No. 60(1985)-161255 is a movement state control apparatus of this kind wherein a yaw rate or a lateral acceleration is detected as a movement state variable of the vehicle and multiplied by a feedback gain to determine a feedback control amount so that a rear wheel steering mechanism is operated in accordance with the feedback control amount to steer a set of rear road wheels thereby to stabilize the movement state of the vehicle.

In such a conventional movement state control apparatus, the feedback gain is varied in accordance with a travel speed of the vehicle, strength of side wind, a weather condition, a road surface condition, etc. through trial and error. It is, therefore, difficult to determine an optimal feedback gain in movement dynamics. Since in the conventional control apparatus, any consideration is not given to the fact that various kinds of parameters of the vehicle are changed by variation of a loaded condition of the vehicle, secular change of the wheel tires, etc., it is difficult to constantly maintain the movement state of the vehicle in an optimal condition. Since any consideration is not given to influences of zero-point drift and high frequency noise of a sensor for detecting movement state of the vehicle, an error is unexpectedly included in control of the movement state of the vehicle.

SUMMARY OF THE INVENTION

It is, therefore, a primary object of the present invention to provide a movement state control apparatus capable of constantly maintaining the movement state of the vehicle in an optimal condition even if various kinds of parameters of the vehicle are changed and of effecting an optimal control of the movement state of the vehicle without any influences of the zero-point drift and high frequency noise of the sensor.

According to the present invention, the object is accomplished by providing a movement state control apparatus for a wheeled vehicle having a control system for controlling a movement state of the vehicle, which comprises detection means for detecting a movement state variable of the vehicle, determination means for determining a target movement state variable of the vehicle, calculation means for calculating a feedback control amount by multiplying a difference between the detected movement state variable and the target movement state variable with a feedback gain of a predetermined frequency characteristic, and control means for controlling the control system of the vehicle in accordance with the calculated feedback control amount to make the movement state variable of the vehicle identical with the target movement state variable.

In a practical embodiment of the present invention, it is preferable that the feedback gain is determined to be decreased at a low frequency region and a high frequency region.

According to an aspect of the present invention, there is provided a movement state control apparatus for a wheeled vehicle having a control system for controlling a movement state of the vehicle, which comprises detection means for detecting a movement state variable of the vehicle, determination means for determining a target movement state variable of the vehicle, calculation means for calculating a feedback control amount by weighting plural differences between the detected movement state variable and the target movement state variable at each lapse of a predetermined time and adding up the weighted differences, and control means for controlling the control system of the vehicle in accordance with the calculated feedback amount to make the movement state variable of the vehicle identical with the target movement state variable.

BRIEF DESCRIPTION OF THE DRAWINGS

Other objects, features and advantages of the present invention will be more readily appreciated from the following detailed description of certain preferred embodiments thereof when taken together with the accompanying drawings, in which.

DESCRIPTION OF THE PREFERRED EMBODIMENTS

Hereinafter, a fundamental control theory underlying the present invention will be described for a better understanding.

In the case that a yaw rate $\tau$ and a lateral slip angle $\beta$ are adapted as movement state variables of a wheeled vehicle on a horizontal plane while turning and that a set of rear road wheels are steered to control the movement state variables in an optimal condition, the lateral slip angle $\beta$, yaw rate $\tau$, a travel speed V, a front wheel steering angle $\delta f$ and a rear wheel steering angle $\delta r$ in a model with two degrees-of-freedom are represented by the following equations of motion of the vehicle.

$$dx/dt = Ax + Bu \quad (1)$$

$$X = \begin{bmatrix} \beta \\ \gamma \end{bmatrix} \quad (2)$$

$$U = \begin{bmatrix} \delta_f \\ \delta_r \end{bmatrix} \tag{3}$$

$$A = \begin{bmatrix} a_{11} & a_{12} \\ a_{21} & a_{22} \end{bmatrix} = \begin{bmatrix} -\dfrac{c_f + c_r}{MV} & -1 - \dfrac{a_f c_f - a_r c_r}{MV^2} \\ -\dfrac{a_f c_f - a_r c_r}{Iz} & -\dfrac{a_f^2 c_f + a_r^2 c_r}{IzV} \end{bmatrix} \tag{4}$$

$$B = \begin{bmatrix} b_{11} & b_{12} \\ b_{21} & b_{22} \end{bmatrix} = \begin{bmatrix} \dfrac{c_f}{MV} & \dfrac{c_r}{MV} \\ \dfrac{a_f c_f}{Iz} & \dfrac{a_r c_r}{Iz} \end{bmatrix} \tag{5}$$

In the equations (4) and (5), "M" is the vehicle weight, Iz is a yawing inertia moment of the vehicle, "$a_f$" is a horizontal distance from the center of gravity of the vehicle to a front wheel axle, "$a_r$" is a horizontal distance from the center of gravity of the vehicle to a rear wheel axle, "$c_f$" is a cornering power of front road wheels, and "$c_r$" is a cornering power of rear road wheels. These parameters each are processed as a fixed value in the wheeled vehicle.

The equations (1) and (3) are rewritten as described below.

$$dx/dt = Ax + E\delta_f + C\delta_r \tag{6}$$

In the equation (6), "E and C" are represented by the following equations (7) and (8).

$$E = \begin{bmatrix} e_1 \\ e_2 \end{bmatrix} = \begin{bmatrix} \dfrac{c_f}{MV} \\ \dfrac{a_f c_f}{Iz} \end{bmatrix} \tag{7}$$

$$C = \begin{bmatrix} c_1 \\ c_2 \end{bmatrix} = \begin{bmatrix} \dfrac{c_r}{MV} \\ -\dfrac{a_r c_r}{Iz} \end{bmatrix} \tag{8}$$

Assuming that a target yaw rate τd and a target lateral slip angle βd approximates to a primary retard of a steering input, the target yaw rate τd and lateral slip angle βd are defined by the following equations (9) and (10).

$$xd = \begin{bmatrix} \beta d \\ \gamma d \end{bmatrix} = \begin{bmatrix} \dfrac{K_b}{1+s\tau_b} \beta_0 \\ \dfrac{K_r}{1+s\tau_r} \gamma_0 \end{bmatrix} \tag{9}$$

$$\begin{bmatrix} \beta_0 \\ \gamma_0 \end{bmatrix} = \left( \dfrac{(a_f + a_r)^2 c_f c_r}{MIzV} - \dfrac{a_f c_f - a_r c_r}{Iz} \right) \tag{10}$$

$$\begin{bmatrix} \dfrac{a_r(a_f + a_r)c_f c_r}{MIzV^2} + \dfrac{a_f c_f}{Iz} \\ \dfrac{(a_f + a_r)c_f c_r}{MIzV^2} \end{bmatrix}$$

In the equations (9) and (10), "$\beta_0$, $\tau_0$" are each stationary gain of the lateral slip angle β and yaw rate τ with respect to a steering input in a condition where the rear road wheels are not steered, "$\kappa_b$, $\kappa_r$" each are each ratio of the lateral slip angle β and yaw rate τ to the stationary gains $\beta_0$, $\tau_0$ in a condition where the rear road wheels are steered. "$\tau_b$, $\tau_r$" are each primary retard constant of the lateral slip angle β and yaw rate τ, and "s" is a Laplace operator.

Assuming that the state variable x has coincided with the target state variable xd, the following equation (11) is satisfied.

$$d(xd)/dt = A(xd) + E\delta_f + C((\delta_r + \delta_{rc})) \tag{11}$$

In the equation (11), "$\delta_{rc}$" is a feedback rear wheel steering angle for correction of a deviation e from an equilibrium condition where the equation "x=xd" is satisfied. An equation of motion with respect to the deviation "e=xd−x" is obtained as described below on a basis of the equations (6) and (11).

$$de/dt = Ae + C\delta_{rc} \tag{12}$$

Accordingly, a rear wheel steering control rule for a desired dynamic characteristic is defined by calculation of the feedback rear wheel steering angle $\delta_{rc}$ for making the deviation e with a dynamic characteristic zero.

Figure 1:
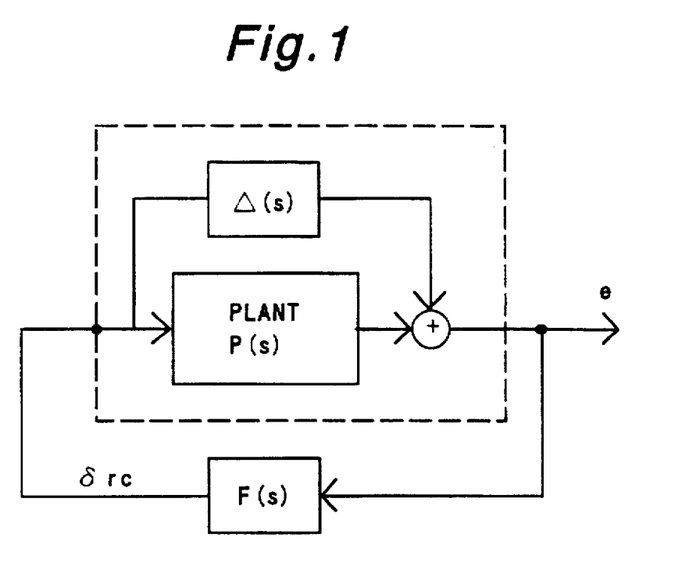
FIG. 1 is a block diagram of a control model of a wheeled vehicle.
Figure 2:
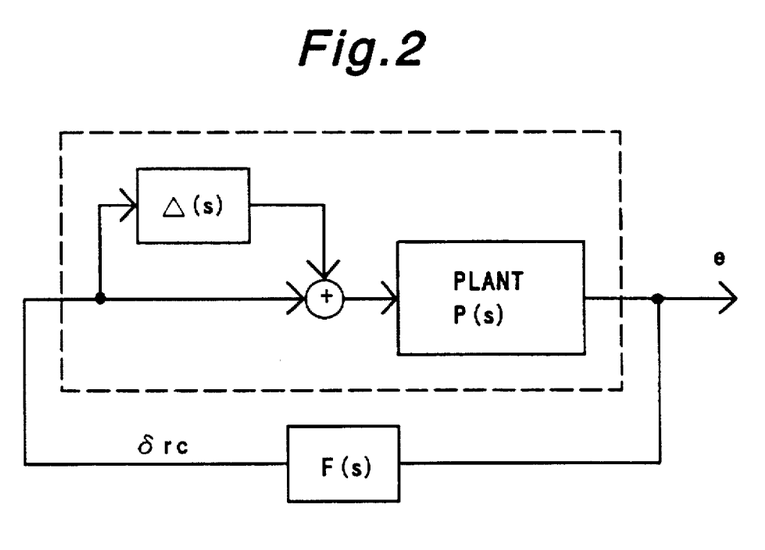
FIG. 2 is an equivalent block diagram of the control model shown in FIG. 1.

In FIGS. 1 and 2 there is a vehicle control model which corresponds with the equation of motion ((12). In the vehicle control model, a block enclosed by a broken line represents a wheeled vehicle to be controlled, P(s) is a transfer function of the feedback rear wheel steering angle $\delta_{rc}$ relative to the deviation e in a condition where parameters of the vehicle or parameter matrix A, C of the equation (12) do not change. A(s) is a transfer function representing variation of the vehicle parameters caused by loaded weight of the vehicle, secular change of the wheel tires, etc., and F(s) is a transfer function of the deviation e relative to the feedback rear wheel steering angle $\delta_{rc}$.

When the parameter matrix A, C of the wheeled vehicle has changed, a H-∞ control theory capable of ensuring robust stability or a μ-synthesis method capable of theoretically ensuring robust control characteristics is adapted to produce a feedback gain F(s) with a predetermined frequency characteristics as represented by the following equation (13) and to calculate the feedback rear wheel steering angle $\delta_{rc}$ as represented by the following equation (14). That is to say, it is able to calculate the feedback gain F(s) and feedback rear wheel steering angle $\delta_{rc}$ in consideration with the transfer function A(s) in FIGS. 1 and 2.

$$F(s) = [F_1(s)F_2(s)] \tag{13}$$

$$\delta_{rc} = F(s)e = F_1(s)(\beta d - \beta) + F_2(s)(\tau d - \tau) \tag{14}$$

Figure 3:
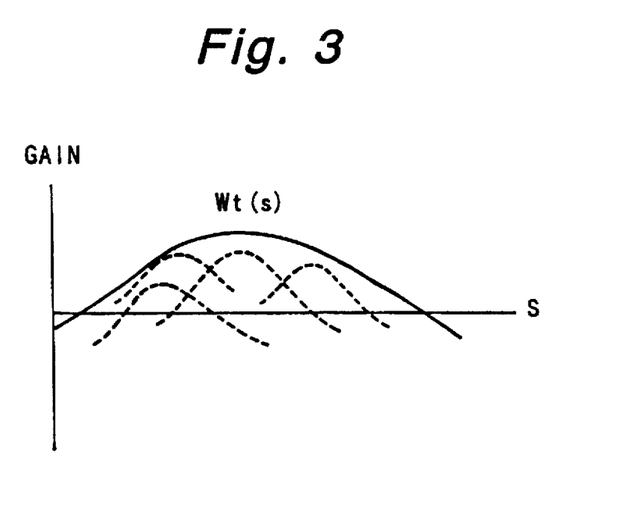
FIG. 3 is a graph showing a gain curve of a transfer function for ensuring robust stability of the vehicle.
Figure 4:
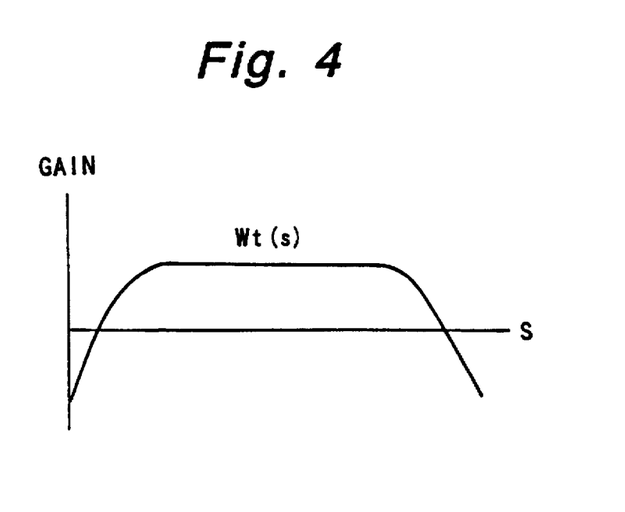
FIG. 4 is a graph showing a gain curve of a transfer function for ensuring a control sensitivity regardlessly of a zero point drift of a sensor and high frequency noises.

Hereinafter, a method for determining the transfer functions F(s), $F_1(s)$ and $F_2(s)$ will be described. In this determination method, transfer functions P(s), Wt(s) and Ws(s) are determined as follows: The transfer function P(s) is determined by various kinds of parameters of the wheeled vehicle in a condition where the parameters do not change. The transfer function Wt(s) is weighted in accordance with a frequency taking into consideration the robust stability. For determination of the transfer function Wt(s), it is assumed that the parameters of the wheeled vehicle have changed due to loaded weight of the vehicle, secular change of the wheel tires, etc. Under such assumption, various gains are produced in accordance with the variation of the parameters as shown by broken lines in FIG. 3, and a gain curve well over all the various gains is produced as the transfer function Wt(s) as shown by a solid line in FIG. 3. The transfer function Ws(s) is weighted in accordance with a frequency for effecting a desired control sensitivity regardlessly of zero-point drift and high frequency noise of sensors for detection of the lateral slip angle β and yaw rate τ. For determination of the transfer function Ws(s), a gain curve is produced as the transfer function Ws(s) as shown by a solid line in FIG. 4. The gain curve is determined in a lower value at low and high frequency regions to avoid influences caused by the zero- point drift and high frequency noise of the sensors. Based on the transfer functions P(s), Wt(s), Ws(s), the transfer functions F(s), $F_1(s)$ and $F_2(s)$ are produced using the H-∞ control theory or the μ-synthesis method. Thus, the feedback rear wheel steering angle $\delta_{rc}$ is calculated on a basis of the transfer functions F(s), $F_1(s)$, $F_2(s)$ so that the rear road wheels are steered at the calculated steering angle $\delta_{rc}$ to ensure the robust stability against the variation of various parameters of the vehicle caused by loaded weight of the vehicle, secular change of the wheels tires, etc. and to secure an optimal control characteristics regardlessly of the zero-point drift and high frequency noise of the sensors.

In the case that a microcomputer is adapted to calculate the target lateral slip angle βd, target yaw rate τd and feedback rear wheel steering angle arcs it is needed to convert the equations (9) and (14) respectively into a discrete system. The equation (9) is converted into a discrete system as described below.

$$\beta d[n] = g_{10}\beta_0[n] + g_{11}\beta_0[n-1] + h_1\beta d[n-1] \quad (15)$$

$$\tau d[n] = g_{20}\tau_0[n] + g_{21}\tau_0[n-1] + h_2\tau d[n-1] \quad (16)$$

In the equations (15) and (16), "$g_{10}$, $g_{11}$, $h_1$, $g_{20}$, $g_{21}$ and $h_2$" are represented respectively as described below.

$$g_{10} = \frac{\kappa b \, T/\tau b}{2 + T/\tau b} \quad (17)$$

$$g_{11} = \frac{\kappa b \, T/\tau b}{2 + T/\tau b} \quad (18)$$

$$h_1 = \frac{2 - T/\tau b}{2 + T/\tau b} \quad (19)$$

$$g_{20} = \frac{\kappa r \, T/\tau r}{2 + T/\tau r} \quad (20)$$

$$g_{21} = \frac{\kappa r \, T/\tau r}{2 + T/\tau r} \quad (21)$$

$$h_2 = \frac{2 - T/\tau r}{2 + T/\tau r} \quad (22)$$

In the equations (17)–(22), "T" is a calculation period. The equation (14) is converted into a discrete system as described below.

$$\begin{aligned}\delta rc[n] = & f_{10} \cdot (\beta d[n] - \beta[n]) + \\ & f_{11} \cdot (\beta d[n-1] - \beta[n-1]) + \ldots + \\ & f_{1k} \cdot (\beta d[n-k] - \beta[n-k]) + \\ & f_{20} \cdot (\gamma d[n] - \gamma[n]) + \\ & f_{21} \cdot (\gamma d[n-1] - \gamma[n-1]) + \ldots + \\ & f_{2k} \cdot (\gamma d[n-k] - \gamma[n-k]) + \\ & g_1 \cdot \delta rc[n-1] + g_2 \cdot \delta rc[n-2] + \ldots + \\ & g_k \cdot \delta rc[n-k]\end{aligned} \quad (23)$$

where k is each degree of the transfer functions $F_1(s)$, $F_2(s)$.

In the equation (23), coefficients $f_{10}$, $f_{11}$, . . . $f_{1k}$, $f_{20}$, $f_{21}$, . . . $f_{2k}$, $g_1$, $g_2$, . . . $g_k$ are defined as each coefficient in the following equations (24) and (25) where the transfer functions $F_1(s)$, $F_2(s)$ each are converted into a discrete system using z-transformation or Tustin transformation.

$$F_1(z) = \frac{f_{10} + f_{11}z^{-1} + \ldots + f_{1k}z^{-k}}{1 + g_1 z^{-1} + \ldots + g_k z^{-k}} \quad (24)$$

$$F_2(z) = \frac{f_{20} + f_{21}z^{-1} + \ldots + f_{2k}z^{-k}}{1 + g_1 z^{-1} + \ldots + g_k z^{-k}} \quad (25)$$

In the equations (24) and (25), "z" is a retard operator indicative of a retard in the discrete system.

Figure 5:
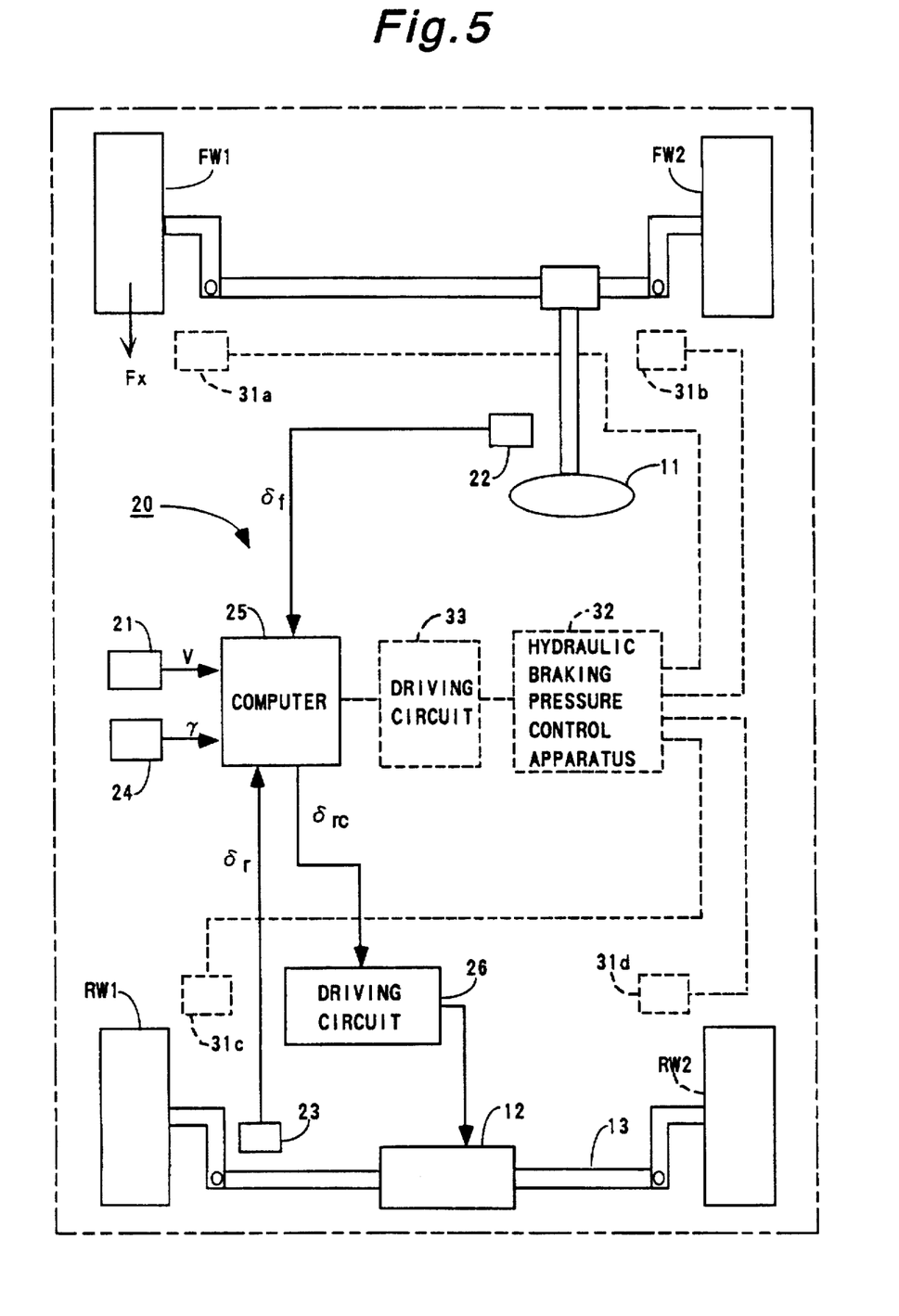
FIG. 5 is a schematic illustration of a wheeled vehicle.

Hereinafter, a practical embodiment of a rear wheel steering control system based on the foregoing control theory will be described. Illustrated in FIG. 5 is a four-wheel steered vehicle which is equipped with a steering wheel 11 for steering a set of dirigible front road wheels FW1, FW2 and an electrically operated actuator 12 for steering a set of dirigible rear road wheels RW1, RW2. The actuator 12 is drivingly connected to a relay rod 13 the opposite ends of which are operatively connected to the rear road wheels RW1, RW2. The actuator 12 is activated under control of an electric control apparatus 20 to drive the relay rod 13 in an axial direction thereby to steer the rear road wheels RW1, RW2.

The electric control apparatus 20 includes a microcomputer 25 which is connected to a vehicle speed sensor 21 for detecting a travel speed V of the vehicle, a front wheel steering angle sensor 22 for detecting a steering angle δf of the front road wheels FW1, FW2, a rear wheel steering angle sensor 23 for detecting a steering angle δr of the rear road wheels RW1, RW2 and a yaw rate sensor 24 for detecting a yaw rate τ as a movement state variable of the vehicle. The computer 25 memorizes a rear wheel steering control program shown by a flow chart in FIG. 6 and a lateral slip angle detection program shown by a flow chart in FIG. 8. Thus, the computer 25 is programmed to repeat execution of the control programs upon each lapse of a predetermined time T identical with the calculation period or cycle described above. In addition, the computer 25 is connected to a driving circuit 26 which is provided to activate the actuator 12 in response to ah electric control signal applied thereto from the computer 25 to steer the rear road wheels RW1, RW2.

Figure 6:
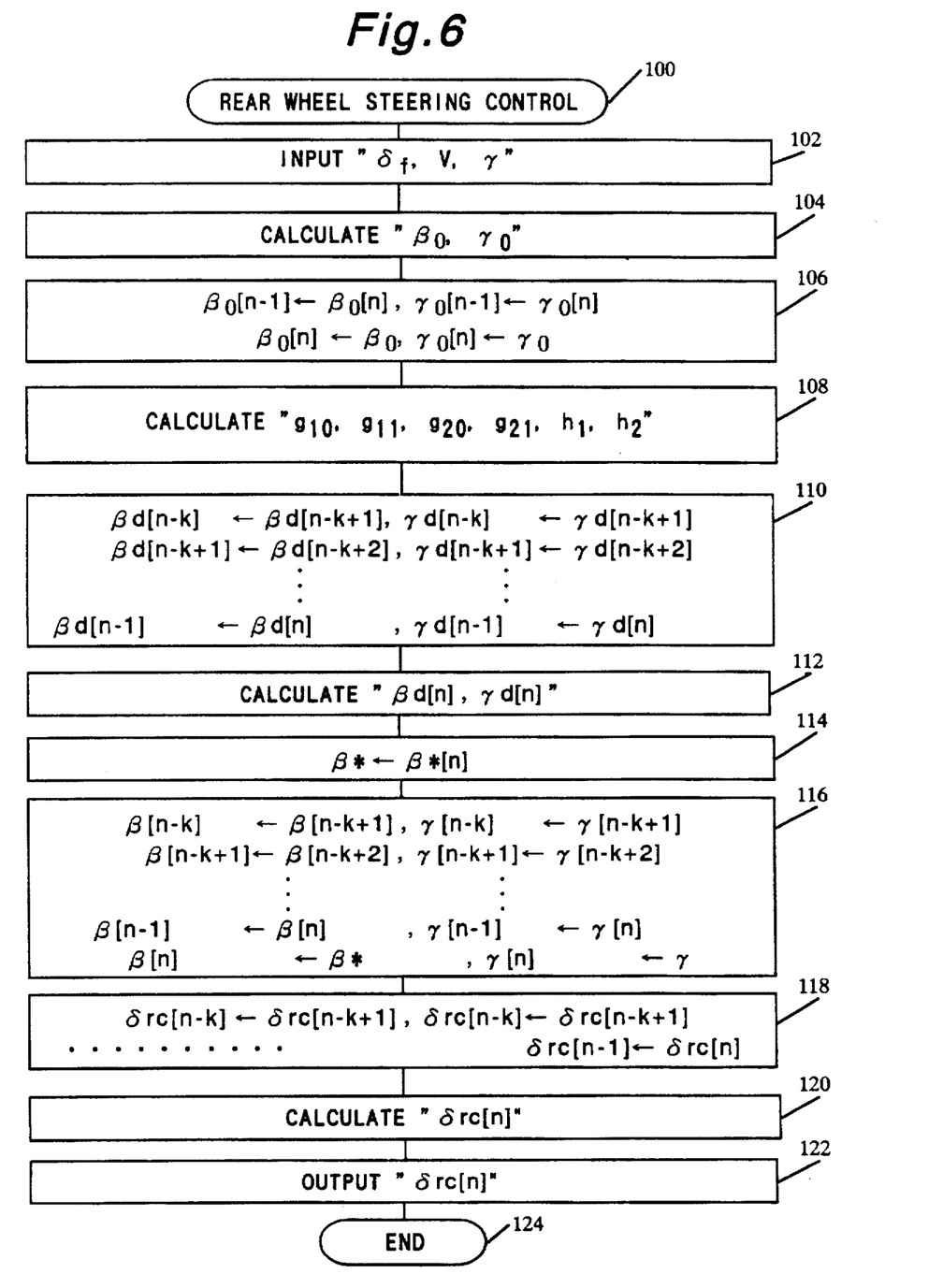
FIG. 6 is a flow chart of a rear wheel steering control program executed by a microcomputer shown in FIG. 5.

In operation, the computer 25 starts at step 100 to execute the control program shown in FIG. 6. At step 102, the computer 25 reads out electric signals respectively indicative of a vehicle speed V, a front wheel steering angle δf and a yaw rate τ from the sensors 21, 22 and 24. Subsequently, the computer 25 executes at step 104 calculation of the equation (10) using the input vehicle speed V and predetermined parameters M, Iz, $a_f$, $a_r$, $c_f$, $c_r$ of the vehicle to obtain respective stationary gains $\beta_0$, $\tau_0$ of a lateral slip angle β and the yaw rate τ of the vehicle. At the following step 106, the computer 25 renews previous data $\beta_0[n-1]$, $\tau_0[n-1]$ respectively indicative of prior stationary gains $\beta_0$, $\tau_0$ before the time T for present data $\beta_0[n]$, $\tau_0[n]$ indicative of instant stationary gain $\beta_0$, $\tau_0$ and renews the present data $\beta_0[n]$, $\tau_0[n]$ for the calculated stationary gains $\beta_0$, $\tau_0$. In this instance, the previous and present data each are being set as an initial value by initialization (not shown) at an initial stage.

After processing at step 106, the computer 25 executes at step 108 calculation of the equations (17)–(22) using predetermined coefficients κb, τb, κr, τr, T to obtain coefficients $g_{10}$, $g_{11}$, $h_1$, $g_{20}$, $g_{21}$, $h_2$. When the program proceeds to step 110, the computer 25 renews a time series of data βd[n−k], . . . , βd[n−1] respectively indicative of a target lateral slip angle βd at each lapse of the time T from the prior time kT for a time series of data βd[n−k+1], . . . , βd[n] after lapse of the time T and renews a time series of data τd[n−k], . . . , τd[n−1] respectively indicative of a target yaw rate τd at each lapse of time T from the prior time kT for a time series of data $\tau d[n-k+1], \ldots, \tau d[n]$ after lapse of the time T. After processing at step 110, the computer 25 executes at step 112 calculation of the equations (15) and (16) using the calculated coefficients $g_{10}, g_{11}, h_1, g_{20}, g_{21}, h_2$ and, the renewed data $\beta_0[n-1], \tau_0[n-1], \beta_0[n], \tau_0[n], \beta d[n-1], \tau d[n-1]$ to obtain present target lateral slip angle $\beta d[n]$ and yaw rate $\tau d[n]$. Thus, the computer 25 executes at step 114 the lateral slip angle detection program of FIG. 8 to set the present lateral slip angle $\beta^*[n]$ as a lateral slip angle $\beta^*$.

When the program proceeds to step 116, the computer 25 renews a time series of data $\beta[n-k], \ldots, \beta[n-1]$ respectively indicative of a lateral slip angle $\beta$ detected at each lapse of the time T from the prior time kT for a time series of data $\beta[n-k+1], \ldots, \beta[n]$ after lapse of the time T and sets the time series data $\beta[n]$ indicative of the presently detected lateral slip angle $\beta$ as the lateral slip angle $\beta^*$. Subsequently, the computer 25 renews at step 116 a time series of data $\tau[n-k], \ldots, \tau[n-1]$ respectively indicative of a yaw rate $\tau$ detected at each lapse of the time T from the prior time kT for a time series of data $\tau[n-k+1], \ldots, \tau[n]$ after lapse of the time T and sets the time series data $\tau[n]$ indicative of the presently detected yaw rate $\tau$ as the yaw rate $\tau$. At the following step 118, the computer 25 renews a time series of data $\tau rc[n-k], \ldots, \delta rc[n-1]$ respectively indicative of a feedback rear wheel steering angle $\delta rc$ detected at each lapse of the time T from the prior time kT for a time series of data $\delta rc[n-k+1], \ldots, \delta rc[n]$ after lapse of the time T. In this instance, the time series of data is set as a predetermined initial value by initialization (not shown).

After processing at step 118, the computer 25 executes at step 120 calculation of the equation (23) using the time series of data renewed at step 110, 112, 116, 118 and coefficients defined by the equations (24) and (25) to obtain the present feedback rear wheel steering angle $\delta rc[n]$. Thus, the computer 25 applies at step 122 an electric control signal indicative of the rear wheel steering angle $\delta rc[n]$ to the driving circuit 26 and finishes at step 124 the execution of the rear wheel steering control program. When applied with the electric control signal, the driving circuit 26 activates the actuator 12 so that the rear road wheels RW1, RW2 are steered at the feedback rear wheel steering angle $\delta rc[n]$.

Figure 8:
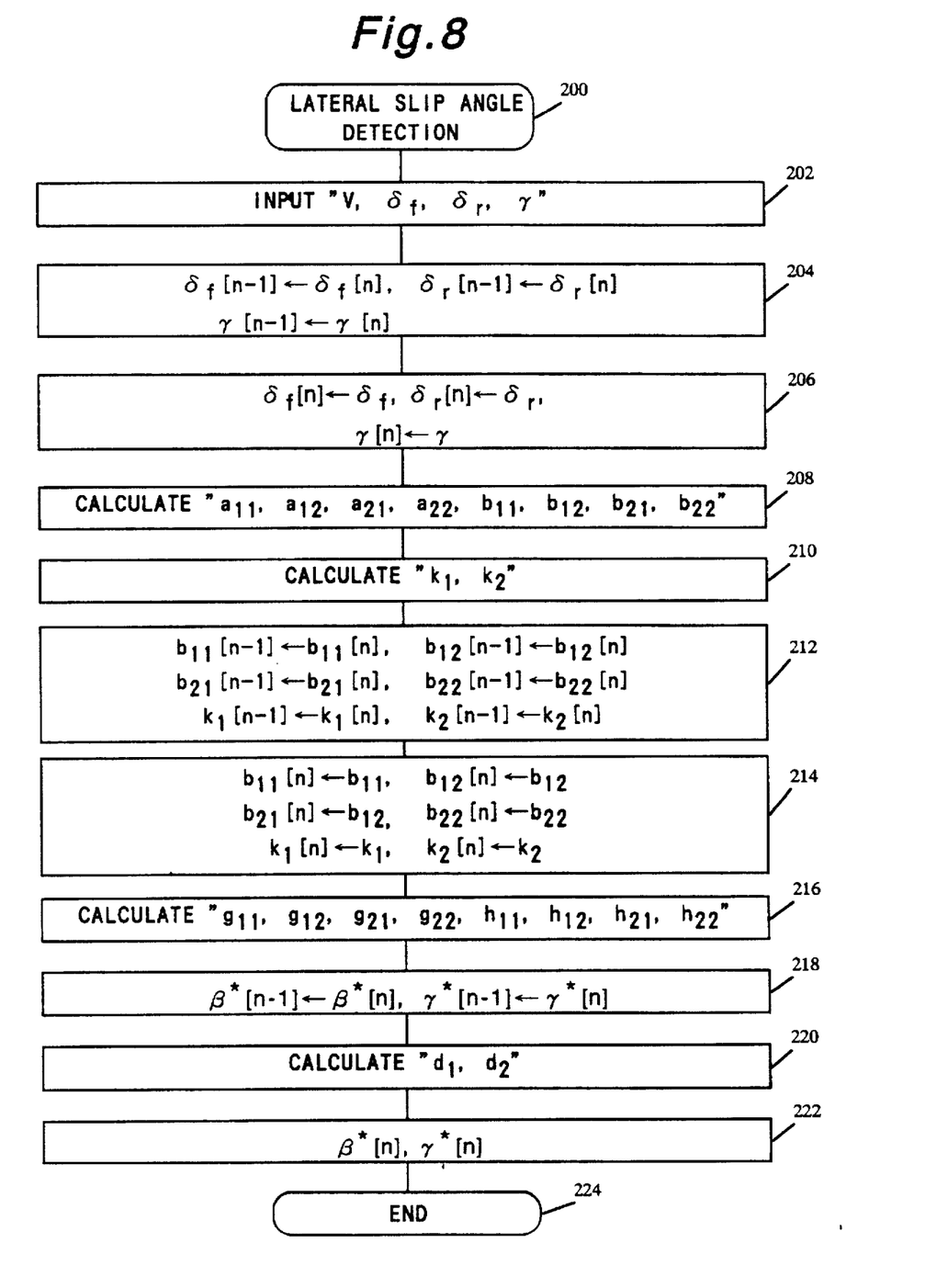
FIG. 8 is a flow chart of a lateral slip angle detection program executed by the computer shown in FIG. 5.

As is understood from the above description, the yaw rate $\tau$ is detected by the yaw rate sensor 24 as one of movement state variables of the vehicle on a horizontal plane while turning, and the lateral slip angle $\beta$ is detected as the other movement variable of the vehicle by means of the speed sensor 21, front wheel steering angle sensor 22, rear wheel steering angle sensor 23, yaw rate sensor 24 and processing of the control program shown in FIG. 8. In addition, the target lateral slip angle $\beta d$ and yaw rate $\tau d$ are determined as a target movement state variable by processing at step 112. Thus, the target lateral slip angle $\beta d$ and yaw rate $\tau d$ and the deviation between the detected lateral slip angle $\beta$ and yaw rate $\tau$ are multiplied by the feedback gain at step 120 to obtain the feedback rear wheel steering angle $\delta rc$ so that the rear road wheels RW1, RW2 are steered at the feedback rear wheel steering angle $\delta rc$ by processing at step 122. This is useful to ensure robust stability of the vehicle against variation of various parameters caused by loaded weight of the vehicle, secular change of the wheel tires, etc. and to ensure desired control characteristics regardlessly of the zero-point drift and high frequency noise of the sensors. As a result, the movement state of the vehicle on the horizontal plane while turning can be controlled to the target movement state.

Hereinafter, a method for detecting a lateral slip angle $\beta$ in the above embodiment will be described. In this detection method, the relationship among the lateral slip angle $\beta$, yaw rate $\tau$, vehicle speed V, front wheel steering angle $\delta_f$ and rear wheel steering angle $\delta_r$ is defined by the equation of motion of the vehicle as in the equations (1)–(5). Since the yaw rate $\tau$ can be measured by an angular velocity sensor in a relatively simple manner, the yaw rate $\tau$ is adapted as an observable movement variable. On the other hand, the lateral slip angle $\beta$ is adapted as an unobservable movement variable since measurement of the lateral slip angle $\beta$ is, in general, difficult. For this reason, assuming that an observer for estimating the lateral slip angle $\beta$ is applied with the yaw rate $\tau$ as a reference input, an output equation of the observer is represented by the following equations (26) and (27).

$$Y = CX \tag{26}$$

$$C = [0\ 1] \tag{27}$$

Figure 7:
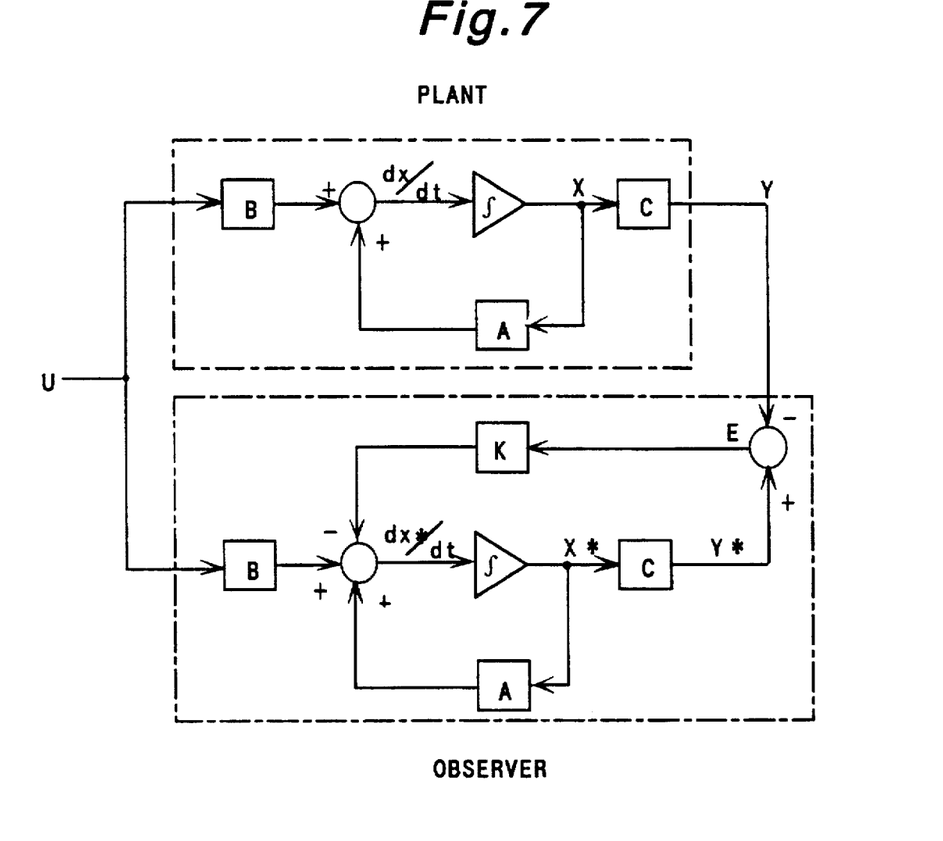
FIG. 7 is a block diagram of a model with two degrees-of-freedom wherein an observer of a primary dimension is estimated.

In the case that the same observer of the primary dimension as the movement state model (plant) represented by the equations (1)–(5) and (26), (27) is composed, the entire model is represented as shown in FIG. 7. In this model, the state equation of the observer is represented as described below.

$$dX^*/dt = (A-KC)X^* + KY + BU = AX^* + BU - KC(X^* - X) \tag{28}$$

where $X^*$ is an estimation value of "X", "$dX^*/dt$" is a differentiated value of the estimation value, and "K" is a feedback gain of the observer. Assuming that a pole of "A−KC" is defined by negative constants $p_1, p_2$, "$X^*$" is converged into "X" as is well known. In the case that the pole of "A−KC" is defined by $p_1, p_2$ and that a Laplace operator is represented by "s", the feedback gain K is represented as described below.

$$|sI - (A-KC)| = (s-p_2) \tag{29}$$

where "I" is a unit matrix.

$$K = \begin{bmatrix} -\{a_{11}(-a_{11}+p_1+p_2) - p_1p_2 - a_{21}a_{12}\}/a_{21} \\ a_{11}+a_{22}-(p_1+p_2) \end{bmatrix} = \begin{bmatrix} k_1 \\ k_2 \end{bmatrix} \tag{30}$$

Since elements "$a_{11}$"–"$a_{22}$", "$b_{11}$–$b_{22}$" of the foregoing coefficients A, B each are a function of the vehicle speed V as defined in the equations (4), (5), the feedback gain K becomes a function of the vehicle speed V. Thus, an observer the pole of which is defined by $p_1, p_2$ can be composed without depending on the vehicle speed V.

In a practical calculation, it is needed to make the equation (28) discrete. Assuming that a control period or calculation cycle is defined by "T", a discrete system corresponding with the equation (1) is represented by the following equation (31).

$$X[n] = A_d X[n-1] + B_d U[n] \tag{31}$$

Provided that, the coefficients $A_d$, $B_d$ are represented by the following equations (32) and (33), respectively.

$$A_d = e^{AT} \tag{32}$$

$$B_d = (\int_0^T e^{AT_d} dt)B \tag{33}$$

When the equation (31) is applied to the equation (28), the state equation of the observer is represented by the following equation (34).

$$X^*[n]=E_d X^*[n-1]+K_d Y[n]+F_d U[n] \quad (34)$$

Provided that, the coefficients $E_d$, $K_d$, $F_d$ are represented as described below.

$$E_d=e^{(A-KC)T} \quad (35)$$

$$K_d=(\int_0^T e^{(A-KC)t}dt)K \quad (36)$$

$$F_d=(\int_0^T e^{(A-KC)t}dt)B \quad (37)$$

In conversion into the discrete system, "A–KC", "K", "B" in the foregoing equations (31)–(37) each fluctuate as a function of the vehicle speed V in accordance with lapse of a time. It is, therefore, required to introduce bilinear transformation or Tustin transformation for conversion into the discrete system. In the bilinear transformation, a Laplace operator "s" is represented by the following equation.

$$s = \frac{2(z-1)}{T(z+1)} \quad (38)$$

where "z" is a retard operator, and "$z^{-d}X[n]$" corresponds with "X[n−d].

Thus, the equation (28) can be rewritten by using the Laplace operator "s" as described below.

$$s\beta = a_{11}\beta + (a_{11}-k_1)\tau^* + k_1\tau + b_1\delta_f + b_{12}\delta_r \quad (39)$$

$$s\tau^* = a_{21}\beta^* + (a_{22}-k_2)\tau^* + k_2\tau + b_{21}\delta_f + b_{22}\delta_r \quad (40)$$

When the above equation (38) is substituted into the equations (39) and (40) and expanded, the following equation (41) is obtained.

$$\begin{bmatrix} z\beta^* \\ z\gamma^* \end{bmatrix} = \begin{bmatrix} 2-Ta_{11} & -T(a_{12}-k_1) \\ -Ta_{21} & 2-T(a_{22}-k_2) \end{bmatrix}^{-1} \quad (41)$$

$$\left\{ \begin{bmatrix} 2+Ta_{11} & T(a_{12}-k_2) \\ Ta_{21} & 2+T(a_{22}-k_2) \end{bmatrix} \begin{bmatrix} \beta^* \\ \gamma^* \end{bmatrix} + \begin{bmatrix} T(z+1)(k_1\gamma+b_{11}\delta_f+b_{12}\delta_r) \\ T(z+1)(k_2\gamma+b_{21}\delta_f+b_{22}\delta_r) \end{bmatrix} \right\}$$

When each coefficient of the equation (41) is expanded as a function of the vehicle speed V by using the equations (4) and (5), the following equation (42) is obtained.

$$\begin{bmatrix} z\beta^* \\ z\gamma^* \end{bmatrix} = \begin{bmatrix} g_{11} & g_{12} \\ g_{21} & g_{22} \end{bmatrix} \begin{bmatrix} \beta^* \\ \gamma^* \end{bmatrix} + \begin{bmatrix} h_{11} & h_{12} \\ h_{21} & h_{22} \end{bmatrix} \begin{bmatrix} T(z+1)(k_1\gamma+b_{11}\delta_f+b_{12}\delta_r) \\ T(z+1)(k_2\gamma+b_{21}\delta_f+b_{22}\delta_r) \end{bmatrix} \quad (42)$$

In the equation (42), "$g_{11}$–$g_{22}$" and "$h_{11}$–$h_{22}$" are represented as described below.

$$g_{11} = \frac{1}{4-2(p_1+p_2)T+p_1p_2T^2} \cdot \quad (43)$$

$$\left\{ 4-2(p_1+p_2)T-p_1p_2T^2 - \frac{4(c_f+c_r)T}{MV} \right\}$$

$$g_{12} = \frac{1}{4-2(p_1+p_2)T+p_1p_2T^2} \cdot \frac{4l_zT}{a_fc_f-a_rc_r} \quad (44)$$

$$\left\{ p_1p_2 + \frac{(c_f+c_r)(p_1+p_2)}{MV} + \frac{(c_f+c_r)^2}{M^2V^2} \right\}$$

$$g_{21} = \frac{1}{4-2(p_1+p_2)T+p_1p_2T^2} \cdot \frac{-4(a_fc_f-a_rc_r)T}{l_z} \quad (45)$$

$$g_{22} = \frac{1}{4-2(p_1+p_2)T+p_1p_2T^2} \cdot \quad (46)$$

$$\left\{ 4+2(p_1+p_2)T-p_1p_2T^2 + \frac{4(c_f+c_r)T}{MV} \right\}$$

$$h_{11} = \frac{1}{4-2(p_1+p_2)T+p_1p_2T^2} \cdot \left\{ 2-\left(p1+p2+\frac{c_f+c_r}{MV}\right)T \right\} \quad (47)$$

$$h_{12} = \frac{1}{4-2(p_1+p_2)T+p_1p_2T^2} \cdot \frac{l_zT}{a_fc_f-a_rc_r} \quad (48)$$

$$\left\{ p_1p_2 + \frac{(c_f+c_r)(p_1+p_2)}{MV} + \frac{(c_f+c_r)^2}{M^2V^2} \right\}$$

$$h_{21} = \frac{1}{4-2(p_1+p_2)T+p_1p_2T^2} \cdot \frac{-(a_fc_f-a_rc_r)T}{l_z} \quad (49)$$

$$h_{22} = \frac{1}{4-2(p_1+p_2)T+p_1p_2T^2} \cdot \left\{ 2+\frac{(c_f+c_r)T}{MV} \right\} \quad (50)$$

When the equation (42) is rewritten into a discrete system, the following equation (51) is obtained.

$$\begin{bmatrix} \beta^*[n] \\ \gamma^*[n] \end{bmatrix} = \begin{bmatrix} g_{11}[n] & g_{12}[n] \\ g_{12}[n] & g_{22}[n] \end{bmatrix} \begin{bmatrix} \beta^*[n-1] \\ \gamma^*[n-1] \end{bmatrix} + \begin{bmatrix} h_{11}[n] & h_{12}[n] \\ h_{21}[n] & h_{22}[n] \end{bmatrix} \begin{bmatrix} d_1 \\ d_2 \end{bmatrix} \quad (51)$$

Provided that, "d1", "d2" in the equation (51) are represented by the following equations (52) and (53), respectively.

$$d_1 = T(k_1[n]\gamma[n] + b_{11}[n]\delta_f[n] + b_{12}[n]\delta_r[n] + k_1[n-1]\gamma[n-1] + \quad (52)$$
$$b_{11}[n-1]\delta_f[n-1] + b_{12}[n-1]\delta_r[n-1]$$

$$d_2 = T(k_2[n]\gamma[n] + b_{21}[n]\delta_f[n] + b_{22}[n]\delta_r[n] + k_2[n-1]\gamma[n-1] + \quad (53)$$
$$b_{21}[n-1]\delta_f[n-1] + b_{22}[n-1]\delta_r[n-1]$$

When the equation (51) is successively calculated on a basis of the equations (43)–(50), (52) and (53), a yaw rate $\tau^*$ and a lateral slip angle $\beta^*$ can be estimated as movement state variables of the vehicle.

Hereinafter, a practical method and apparatus for estimating a lateral slip angle $\beta^*$ and a yaw rate $\tau^*$ of a wheeled vehicle will be described on a basis of the foregoing estimation theory. In operation, the computer 25 repetitively executes the program shown by the flow chart in FIG. 8 in parallel with execution of the rear wheel steering control program of FIG. 6 at each lapse of the control period T. Provided that, variables in the program of FIG. 8 are independent of the variables in the rear wheel steering control program of FIG. 6.

The computer 25 initiates execution of the program at step 200 and reads out at step 202 a vehicle speed V, a front wheel steering angle δf, a rear wheel steering angle $δ_r$ and a yaw rate τ detected by the sensors 21, 22, 23 and 24. Subsequently, the computer 25 renews at step 204 previous data $δ_f[n-1]$, $δ_r[n-1]$, τ[n−1] respectively indicative of previous steering angles $δ_f$, $δ_r$ and yaw rate τ for present data $δ_f[n]$, $δ_r[n]$ and τ[n] respectively instant steering angles $δ_f$, $δ_r$ and yaw rate τ and renews at step 206 the present data δf[n], $δ_r[n]$ and τ[n] for the rear out data $δ_f$, $δ_r$ and τ.

After processing at step 206, the computer 25 calculates at step 208 the coefficients $A(a_{11}, a_{12}, a_{21}, a_{22})$ and $B(b_{11}, b_{12}, b_{21}, b_{22})$ of the model shown in FIG. 7 on a basis of the equations (4) and (5). In this instance, the vehicle speed V is detected by processing at step 202 but other parameters M, Iz, $a_f$, $a_r$, $c_f$, $c_r$ each are preliminarily determined as constant in accordance with the type of the vehicle. At the following step 210, the computer 25 calculates feedback gains $k_1$, $k_2$ based on the equation (30) using the poles $p_1$, $p_2$ and the calculated coefficients $A(a_{11}, a_{12}, a_{21}, a_{22})$. Subsequently, the computer 25 renews at step 212 the previous coefficients $b_{11}[n-1]-b_{22}[n-1]$ and feedback gains $k_1[n-1]$, $k_2[n-1]$ for the present coefficients $b_{11}[n]-b_{22}[n]$ and feedback gains $k_1[n]$, $k_2[n]$ respectively indicative of instant coefficients $B(b_{11}, b_{12}, b_{21}, b_{22})$ and instant feedback gains $k_1$, $k_2$. At the following step 214, the computer 25 renews the present coefficients $b_{11}[n]-b_{22}[n]$ and feedback gains $k_1[n]$, $k_2[n]$ for the calculated coefficients $b_{11}-b_{22}$ and feedback gains $k_1$, $k_2$.

After processing at step 214, the computer 25 calculates at step 216 coefficients $g_{11}-g_{22}$, $h_{11}-h_{22}$ based on the equations (43)–(50) using the poles $p_1$, $p_2$, calculation period T, parameters M, Iz, $a_f$, $a_r$, $c_f$, $c_r$ and the detected vehicle speed V. Thereafter, the computer 25 renews at step 218 previously estimated lateral slip angle $\beta^*[n-1]$ and yaw rate $\tau^*[n-1]$ indicative of prior lateral slip angle $\beta^*$ and yaw rate $\tau^*$ estimated before the time T for the presently estimated lateral slip angle $\beta^*[n]$ and yaw rate $\tau^*[n]$ calculated by processing at step 222. Subsequently, the computer 25 calculates at step 220 values $d_1$, $d_2$ based on the equations (52) and (53) using the previous data $b_{11}[n-1]-b_{22}[n-1]$, $k_1[n-1]$, $k_2[n-1]$, $\delta_f[n-1]$, $\delta_r[n-1]$, $\tau[n-1]$ and the present data $b_{11}[n]-b_{22}[n]$, $k_1[n]$, $k_2[n]$, $\delta_f[n]$, $\delta_r[n]$, $\tau[n]$. At the following step 222, the computer 25 calculates the presently estimated lateral slip angle $\beta^*[n]$ and yaw rate $\tau^*[n]$ based on the equation (51) using the previously estimated lateral slip angle $\beta^*[n-1]$ and yaw rate $\tau^*[n-1]$ and the calculated values $d_1$, $d_2$ and using the coefficients $g_{11}-g_{22}$, $h_{11}-h_{22}$ as the present coefficients $g_{11}[n]-g_{22}[n]$, $h_{11}[n]-h_{22}[n]$. Thus, the calculated lateral slip angle $\beta^*[n]$ is used at step 114 of FIG. 6 for control of movement state of the vehicle.

Hereinafter, another practical method for calculating the feedback rear wheel steering angle $\delta_{rc}$ will be described. In this calculation method, "$\delta_{rc}=F(s)e$" of the equation (14) is represented as described below.

$$dx_c/dt = A_c x_c + B_c e \quad (54)$$

$$\delta_{rc} = C_c x_c + D_c e \quad (55)$$

where "$x_c$" is a vertical vector indicative of an internal state of the control system, and "$A_c$, $B_c$, $C_c$, $D_c$" each are a coefficient matrix which is related to the transfer function F(s) as described below.

$$C_c(sI-A_c)^{-1}B_c+D_c=F(s) \quad (56)$$

In the equation (56), I is the same unit matrix of k-dimension as the feedback transfer function F(s).

When the equations (54)–(56) each are converted into a discrete system using the z-transformation or Tustin transformation, the following equations (57)–(59) are obtained.

$$x_c[n]=A_d x_c[n-1]+B_d e[n] \quad (57)$$

$$\delta_{rc}[n]=C_d x_c[n]+D_d e[n] \quad (58)$$

$$F(z)=C_d(zI-A_d)^{-1}B_d+D_d \quad (59)$$

In the equations (57) and (58), "$A_d$, $B_d$, $C_d$, $D_d$" each are a coefficient matrix defined by the equation (59), and "F(z)" is a discrete system converted from the transfer function F(s). Since the transfer function F(s) is determined taking into consideration the robust stability and robust control performance, the coefficient matrixes "A, $B_d$, $C_d$, $D_d$" are determined in a design process. In addition, "e[n]" is a vertical vector indicative of each deviation between the target lateral slip angle $\beta d$ and yaw rate $\tau d$ and the detected lateral slip angle $\beta$ and yaw rate $\tau$ as is represented by the following equation (60). Therefore, the feedback rear wheel steering angle $\delta_{rc}[n]$ defined by the equation (58) becomes the same value in the above embodiment.

$$e[n] = \begin{bmatrix} \beta d[n] - \beta[n] \\ \gamma d[n] - \gamma[n] \end{bmatrix} \quad (60)$$

Hereinafter, a practical embodiment based on the foregoing theory will be described. In this embodiment, the computer 25 is programmed to execute a rear wheel steering control program shown by a flow chart in FIG. 9 in stead of the program shown in FIG. 6. Assuming that the computer 25 has executed processing at step 102–108 in the same manner as in the above embodiment, the computer 25 renews at step 110a the previous data $\beta d[n-1]$ indicative of the target lateral slip angle $\beta d$ before the time T for the present data $\beta d[n]$ indicative of the present target lateral slip angle $\beta d$ and renews the previous data $\tau d[n-1]$ indicative of the target yaw rate $\tau d$ before the time T for the present data $\tau d[n]$ indicative of the present target yaw rate $\tau d$. After processing at step 112, 114 in the same manner as in the above embodiment, the computer 25 sets at step 116a the present data $\beta d[n]$ indicative of the presently detected lateral slip angle $\beta$ as a lateral slip angle $\beta^*$ detected by execution of the foregoing lateral slip angle detection program and defined by processing at step 114 and sets the present data $\tau[n]$ indicative of the presently detected yaw rate $\tau$ as a yaw rate $\tau$ applied at step 102.

Figure 9:
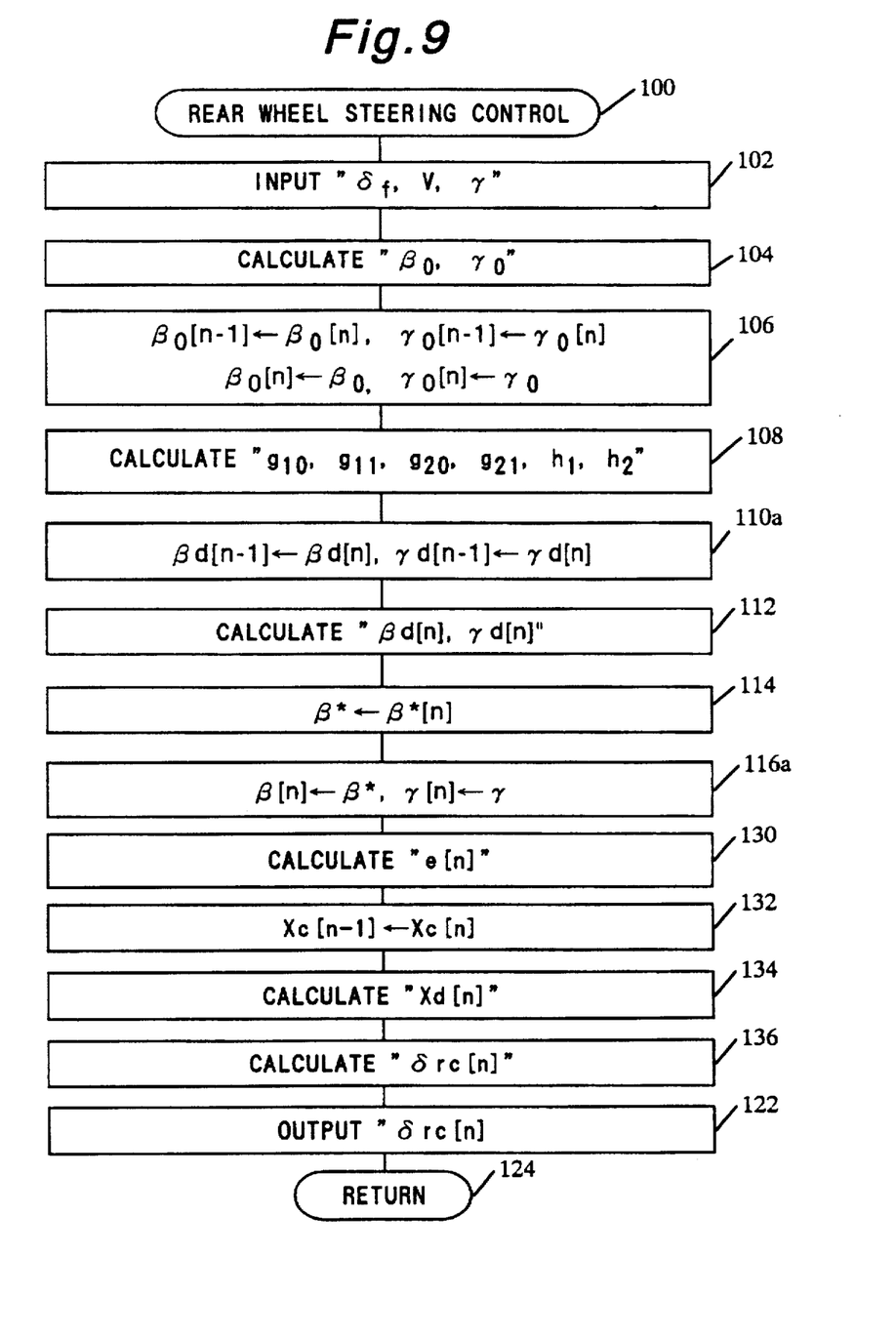
FIG. 9 is a flow chart of a modification of the rear wheel steering control program shown in FIG. 6.

Subsequently, the computer 25 calculates at step 130 a deviation e[n] based on the equation (60) using the target lateral slip angle $\beta d[n]$ and yaw rate $\tau d[n]$ calculated by processing at step 112 and the lateral slip angle $\beta[n]$ and yaw rate $\tau[n]$ detected by processing at step 116a. At the following step 132, the computer 25 renews the previous data $x_c[n-1]$ indicative of a state variable $x_c$ before the time T for the present data $x_c[n]$ indicative of the present state variable $x_c$. Thus, the computer 25 calculates at step 134 the present data $x_c[n]$ indicative of the present state variable $x_c$ based on the equation (57) using the previous data $x_c[n-1]$ indicative of the state variable before the time T, the calculated deviation e[n] and the predetermined coefficient matrix data $A_d$, $B_d$. Subsequently, the computer 25 calculates at step 136 the present feedback rear wheel steering angle $\delta_{rc}[n]$ based on the equation (58) using the deviation e[n], the present data $x_c[n]$ and the predetermined coefficient data $C_d$, $D_d$ and applies at step 122 the calculated feedback rear wheel steering angle $\delta_{rc}[n]$ as a control signal to the driving circuit 26 in the same manner as in the above embodiment. As a result, the rear road wheels RW1, RW2 are steered at the steering angle $\delta_{rc}[n]$.

Hereinafter, a practical embodiment for correcting a movement state of the vehicle on a horizontal plane under control of braking force distribution to the left and right road wheels will be described. Assuming that in this embodiment, a difference in braking force between the left and right road wheels is represented by "Fx" and that a tread of the vehicle is represented by "Tr", the relationship among a lateral slip angle β, a yaw rate τ, a vehicle speed V, a front wheel steering angle δf and the difference Fx in braking force is represented by the following equations (61)–(65) on a basis of the equation of motion of the vehicle.

$$dx/dt = Ax + E\delta f + BFx \tag{61}$$

$$x = \begin{bmatrix} \beta \\ \gamma \end{bmatrix} \tag{62}$$

$$A = \begin{bmatrix} a_{11} & a_{12} \\ a_{21} & a_{22} \end{bmatrix} = \begin{bmatrix} -\dfrac{c_f + c_r}{MV} & -1 - \dfrac{a_f c_f - a_r c_r}{MV^2} \\ -\dfrac{a_f c_f - a_r c_r}{Iz} & -\dfrac{a_f^2 c_f + a_r^2 c_r}{IzV} \end{bmatrix} \tag{63}$$

$$E = \begin{bmatrix} e_1 \\ e_2 \end{bmatrix} = \begin{bmatrix} \dfrac{c_f}{MV} \\ \dfrac{a_f c_f}{Iz} \end{bmatrix} \tag{64}$$

$$B = \begin{bmatrix} b_1 \\ b_2 \end{bmatrix} = \begin{bmatrix} 0 \\ -\dfrac{Tr}{2Iz} \end{bmatrix} \tag{65}$$

When a target state variable xd is defined by the forgoing equations (9) and (10) and a deviation "e" is defined by e=xd−x, an equation of motion with respect to the deviation "e" is represented as described below.

$$de/dt = Ae + BFx \tag{66}$$

since the equation (66) corresponds with the equation (12) in the above embodiment, a control rule for realizing a desired movement characteristic of the vehicle is defined by calculation of the difference Fx in braking force for making the deviation "e" zero. Accordingly, the feedback rear wheel steering angle δ$_{rc}$ in the equations (14)–(25) is replaced with a feedback difference Fx in braking force to calculate the feedback difference Fx in braking force in the same manner as in the above embodiment.

Illustrated in FIG. 5 is a practical embodiment of a hydraulic braking pressure control apparatus 32 which is operated on a basis of the foregoing theory to control distribution of hydraulic braking pressure applied to wheel cylinders 31a–31d of the front and rear road wheels FW1, FW2 and RW1, RW2. The hydraulic braking pressure control apparatus 32 is electrically operated under control of a driving circuit 33 which is applied with a control signal indicative of the difference Fx in braking pressure from the microcomputer 25. In this embodiment, the computer 25 is programmed to execute a braking force distribution control program wherein the feedback rear wheel steering angle δ$_{rc}$ in the programs shown in FIGS. 6 and 8 is replaced with the difference Fx in braking force, and the coefficients are changed to be adaptable for the foregoing theory.

In the embodiment modified as described above, the difference Fx in braking force is controlled by the computer 25 to coincide the lateral slip angle β and yaw rate τ with the target lateral slip angle βd and yaw rate τd. As a result, even if parameters of the vehicle are varied due to change of the vehicle weight, secular change of the wheel tires, etc., the movement characteristic of the vehicle can be controlled in an ideal condition.

Although in the above embodiments the lateral slip angle β and yaw rate τ have been detected as a movement state variable of the vehicle, a lateral velocity, a lateral acceleration and a yaw angle velocity of the vehicle may be detected.

What is claimed is:

1. A movement state control apparatus for a wheeled vehicle having a control system for controlling a movement state of the vehicle, comprising:

detection means for detecting a movement state variable of the vehicle;

determination means for determining a target movement state variable of the vehicle;

calculation means for calculating a feedback control amount by multiplying a difference between the detected movement state variable and the target movement state variable with a feedback gain determined to be decreased to a lesser value at least in a higher frequency region than in a lower frequency region, whereby reducing the effect of noise in the detection means; and control means for controlling the control system of the vehicle in accordance with the calculated feedback control amount to make the movement state variable of the vehicle coincide with the target movement state variable.

2. A movement state control apparatus for a wheeled vehicle having a control system for controlling a movement state of the vehicle, comprising:

detection means for detecting a movement state variable of the vehicle;

determination means for determining a target movement state variable of the vehicle;

calculation means for calculating a feedback control amount by weighting plural differences between the detected movement state variable and the target movement state variable at each lapse of a predetermined time and adding up the weighted differences; and control means for controlling the control system of the vehicle in accordance with the calculated feedback amount to make the movement state variable of the vehicle identical with the target movement state variable.

* * * * *